United States Patent
Shenker et al.

(10) Patent No.: US 10,360,577 B2
(45) Date of Patent: *Jul. 23, 2019

(54) DISTRIBUTED GENERATION OF A COUPON USING A GAME OF CHANCE, A RANDOM NUMBER GENERATOR AND A PAYOUT TABLE TO DETERMINE THE VALUE OF THE COUPON

(71) Applicant: Tapcentive, Inc., San Francisco, CA (US)

(72) Inventors: Gavin Shenker, Los Angeles, CA (US); David Wentker, San Francisco, CA (US); Mike Lindelsee, Redwood City, CA (US); Gabriel Wachob, San Mateo, CA (US)

(73) Assignee: Tapcentive, Inc., San Francisco, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/583,585

(22) Filed: May 1, 2017

(65) Prior Publication Data
US 2017/0330213 A1 Nov. 16, 2017

Related U.S. Application Data

(63) Continuation of application No. 14/326,740, filed on Jul. 9, 2014, now Pat. No. 9,639,865.
(Continued)

(51) Int. Cl.
*G06Q 30/00* (2012.01)
*G06Q 30/02* (2012.01)
*G06F 7/58* (2006.01)

(52) U.S. Cl.
CPC ........ *G06Q 30/0212* (2013.01); *G06F 7/588* (2013.01); *G06Q 30/0267* (2013.01); *G06Q 30/0276* (2013.01); *Y04S 50/14* (2013.01)

(58) Field of Classification Search
CPC .................. G06Q 30/0225; G06Q 30/02
(Continued)

(56) References Cited

U.S. PATENT DOCUMENTS

| 9,639,865 | B2* | 5/2017 | Shenker | G06Q 30/0276 |
| 2008/0065490 | A1* | 3/2008 | Novick | G06Q 30/02 705/14.26 |
| 2011/0087529 | A1* | 4/2011 | Angell | G06Q 30/02 705/14.13 |
| 2015/0031449 | A1* | 1/2015 | Levi | A63F 13/85 463/31 |

FOREIGN PATENT DOCUMENTS

| EP | 1077437 A2 | 2/2001 |
| JP | 2002-150105 A | 5/2002 |

(Continued)

OTHER PUBLICATIONS

Nevada Gaming Control Board. New Gaming Device Submission Package (Jan. 22, 2010). Retrieved online Apr. 24, 2019. https://gaming.nv.gov/modules/showdocument.aspx?documentid=2786 (Year: 2010).*

(Continued)

*Primary Examiner* — James A Reagan
(74) *Attorney, Agent, or Firm* — Panitch Schwarze Belisario & Nadel LLP

(57) ABSTRACT

Coupons are electronically delivered by a coupon generating subsystem to a plurality of mobile devices via gaming sessions experienced on the mobile devices. A memory of the coupon generating subsystem stores a set of rules associated with delivery of the coupons from the coupon generating subsystem to the mobile devices, wherein the set of rules include a payout table that determines the value of coupons that are delivered. A gaming session is initiated on one of the mobile devices when the mobile device is within a broadcast range of the coupon generating subsystem. The gaming session uses a random number generator and a central processing unit of the coupon generating subsystem
(Continued)

to generate a result for the game of chance using the payout table in the memory. The result determines the value of a coupon to be electronically delivered via the coupon generating subsystem to the mobile device.

26 Claims, 7 Drawing Sheets

Related U.S. Application Data

(60) Provisional application No. 61/844,363, filed on Jul. 9, 2013.

(58) Field of Classification Search
USPC .................................................. 705/14.26
See application file for complete search history.

(56) References Cited

FOREIGN PATENT DOCUMENTS

| JP | 2003115002 A | 4/2003 | |
|---|---|---|---|
| JP | 5119818 B2 | 1/2013 | |
| KR | 101157541 B1 | 8/2012 | |
| WO | WO-9639865 A1 * | 12/1996 | ............. A23L 7/117 |
| WO | 2008154658 A1 | 12/2008 | |
| WO | WO 2008154658 A1 * | 12/2008 | ............. G07F 17/32 |

OTHER PUBLICATIONS

International Search Report dated Oct. 21, 2014 Int'l Application No. PCT/US2014/046055.

* cited by examiner

450

```
Determines a mobile device is within a broadcast range of the coupon
generating subsystem.
455
```
↓
```
Queries the mobile device for identifying information.
460
```
↓
```
Transmits a coupon from the coupon generating subsystem to the mobile device.
465
```

```
┌─────────────────────────────────────────────────────────────────┐
│ Receives a coupon transferred from a customer mobile device to a mobile │
│              device associated with the campaign.                │
│                              555                                 │
└─────────────────────────────────────────────────────────────────┘
                                │
                                ▼
┌─────────────────────────────────────────────────────────────────┐
│ Utilizes the mobile device associated with the campaign to perform a validation │
│                         of the coupon.                           │
│                              560                                 │
└─────────────────────────────────────────────────────────────────┘
                                │
                                ▼
┌─────────────────────────────────────────────────────────────────┐
│                       Honors a valid coupon.                     │
│                              565                                 │
└─────────────────────────────────────────────────────────────────┘
                                │
                                ▼
┌─────────────────────────────────────────────────────────────────┐
│                      Denies an invalid coupon.                   │
│                              565                                 │
└─────────────────────────────────────────────────────────────────┘
```

FIG. 5b

DISTRIBUTED GENERATION OF A COUPON USING A GAME OF CHANCE, A RANDOM NUMBER GENERATOR AND A PAYOUT TABLE TO DETERMINE THE VALUE OF THE COUPON

CROSS-REFERENCE TO RELATED APPLICATIONS

This application is a continuation of copending U.S. patent application Ser. No. 14/326,740 filed Jul. 9, 2014, the entire disclosure of which is incorporated by reference herein.

This application claims priority to U.S. Provisional Patent Application No. 61/844,363 entitled "System and Method for distributed Generation of Randomized Coupons" by Gavin Shenker et al., filed Jul. 9, 2013, which is incorporated by reference herein.

BACKGROUND OF THE INVENTION

Retailers and manufacturers frequently sponsor promotions that involve discounts, prizes, limited stock product distribution, etc. These programs are central to marketing efforts by the retailers and manufacturers to incent consumers to make specific purchases, visit particular retail locations, etc. Many of these promotions rely on paper coupons to serve as the proof that a consumer is entitled to receive the afore-mentioned promotion. With the advent of the Internet and mobile technology, many paper-based promotions are transitioning to digital systems where the coupons related to the promotions are generated digitally.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 4b is a flowchart for retrieving coupons from the coupon generating subsystem in accordance with an embodiment.

FIG. 5b is a flowchart depicting the verification of a generated coupon in accordance with an embodiment.

DETAILED DESCRIPTION OF THE INVENTION

Figure 1:
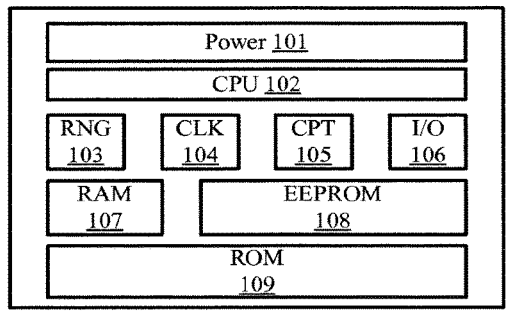
FIG. 1 is a block diagram of a microprocessor platform in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

A distributed generation of coupons system and method is described. One example develops a campaign having a set of rules at a campaign management system. In addition, a communication channel is established between the campaign management system and a coupon generating subsystem. The campaign having a set of rules is provided from the campaign management system to the coupon generating subsystem via the communication channel. The coupon generating subsystem is authorized to independently generate a coupon based on the set of rules of the campaign without requiring communication between the coupon generating subsystem and the campaign management system.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "coupling", "accessing", "changing", "correlating" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

In general, the disclosure describes a system for operating marketing campaigns involving a campaign management subsystem coupled with one or more additional coupon generating subsystems responsible for generation of coupons where the coupon generating subsystems can be physically distributed from the central management subsystem during the generation of the coupons.

The campaign management subsystem creates campaign rules, such as, but not limited to, the setup of the types of coupons and number of coupons to be distributed, and rules that may influence the coupon generation. For example, the rules may include randomization rules or the like. The campaign management subsystem is also used to set up and manage one or more separate and distributed subsystems for secure, near real-time coupon generation; communicate campaign and management data between the campaign management subsystem and the coupon-generating subsystems; validate and redeem generated coupons; and monitor and manage the coupon-generating subsystems.

The coupon-generating subsystem communicates with the campaign management subsystem, generates coupons according to the campaign rules, retrieves generated coupons from the coupon-generating subsystems, and the like.

An embodiment described herein can generate coupons in near real-time. Another embodiment includes an element of randomness in the coupon generation process. The near real-time performance provides instant consumer gratification involving technology. The element of randomness addresses the "offer fatigue" problem by introducing chance into the coupon generation process such that a consumer may receive a highly valuable offer as they might in entering a contest or sweepstakes. An embodiment also includes reasonable security mechanisms to mitigate fraud concerns that are common in digital couponing systems.

It should be noted that the term "coupon" is used throughout this disclosure to refer to a digital token that can be associated with any type of marketing or incentive campaign where the campaign owner is offering something to consumers to incent shopping behavior such as purchasing specific products, visiting specific stores, shopping within limited periods of time, etc. Such tokens may also be associated with loyalty programs where a consumer is accumulating benefits for recurring patronage of a retailer or manufacturer. Therefore, the term "coupon" should not be taken in a limiting sense.

With reference now to FIG. 1, a block diagram of an embodiment of a coupon generating engine 100 is shown. One embodiment of coupon generating engine 100 includes power 101, a central processing unit (CPU) 102, a random number generator (RNG) 103, a connection for an external clock 104 to provide the card with a clock signal from which data communications timing is derived, a cryptographic coprocessor (CPT) 105, an I/O port 106, random access memory (RAM) 107, electrically erasable programmable read only memory (EEPROM) 108, and read only memory (ROM) 109. The software for coupon campaign operations can be stored and run from ROM 109 or EEPROM 108 and would rely on the support of the RNG 103 and CPT 105 for many of the operations.

In general, coupon generating engine 100 is a dedicated computer on a chip or microprocessor for carrying out cryptographic operations, embedded in a packaging with multiple physical security measures, which give it a degree of tamper resistance. Although a number of secure microprocessors may be used herewith. In one embodiment, SmartMX designed by NXP is a microprocessor having data encryption capabilities.

I/O port 106 is a communications interface for coupon generating engine 100 such as a contact interface according to ISO/IEC 7816, contactless interface according to ISO/IEC 14443A, serial input and output (half-duplex), USB, HDMI or other interfaces.

In one embodiment RNG 103 uses a cryptographic hash function to approach a uniform distribution of bits from a non-uniformly random source. In another embodiment, RNG 103 is a pseudo-RNG (PRNG) such as the linear congruential generator. /dev/random is one example of a file that serves as a pseudorandom number generator.

In general, CPT 105 is implemented on a high-security, tamper resistant, programmable PCI board. Specialized cryptographic electronics, microprocessor, memory, and random number generator housed within a tamper-responding coupon generating engine 100 provide a highly secure subsystem in which data processing and cryptography can be performed. In one embodiment, CPT 105 is a high-speed 3-DES coprocessor (64-bit parallel), a high-speed AES coprocessor (128-bit parallel), a PKI (RSA, ECC) coprocessor FameXE (32-bit parallel) such as found on a SmartMX by NXP. However, it should be appreciated that although the SmartMX is disclosed herein, the technology is well suited to using other comparable technologies.

In general, CPU 102 is hardware within a computer that carries out the instructions of a computer program by performing the basic arithmetical, logical, and input/output operations of the system. Two components of CPU 102 are the arithmetic logic unit for performing arithmetic and logical operations, and the control unit for extracting instructions from memory and decoding and executing them, calling on the arithmetic logic unit when necessary. CPU 102 may be multiprocessor, multi-core processors, and the like.

In one embodiment, the communication protocol for coupon generating engine 100 may be ISO-7816 contact, ISO-14443 contactless, or both. Although a number of components are shown, it should be appreciated that microprocessor platform 100 may include more or fewer components. Moreover, in an embodiment, the components described in microprocessor platform 100 may be substituted for other components that provide similar operational capabilities. That is, there are many other options for implementations of the microprocessor platform 100 that could involve other types of processors (micro or otherwise), modules, computing platforms or the like.

Figure 2:
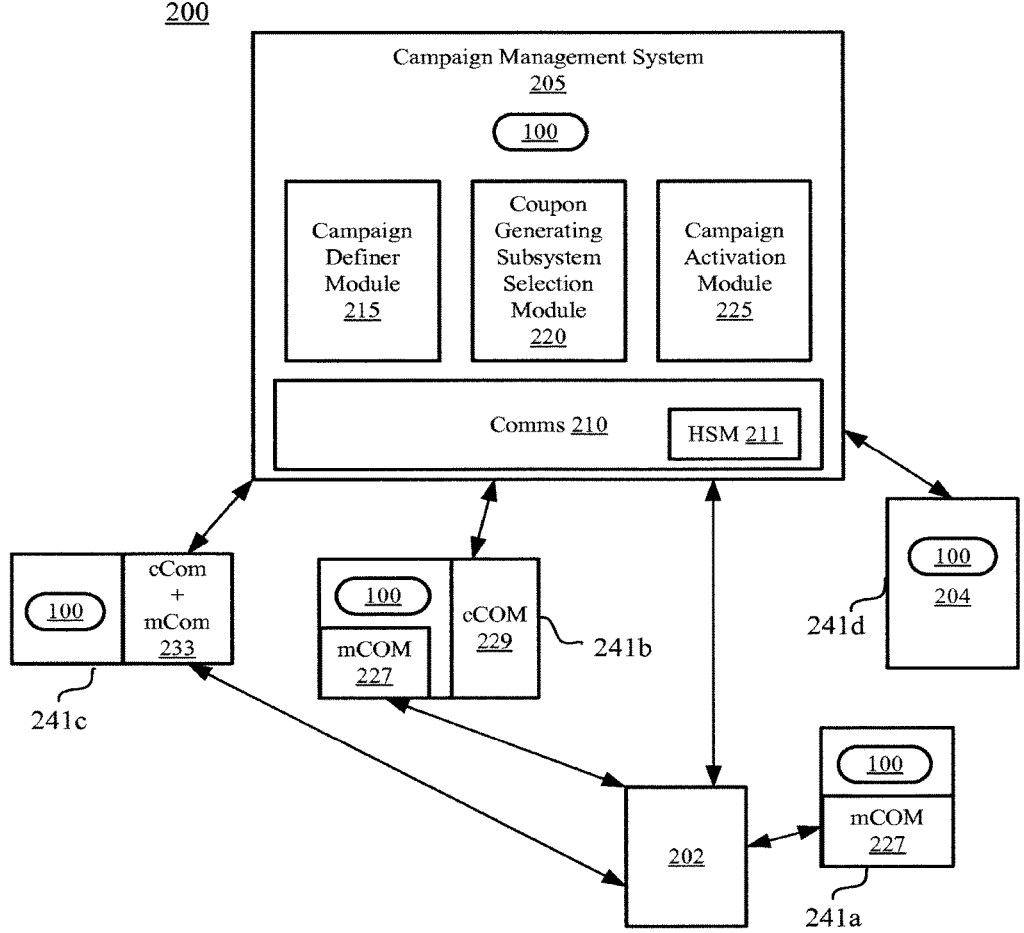
FIG. 2 is a block diagram illustrating the operable interconnections between a coupon management system, and at least one microprocessor platform in accordance with an embodiment.

With reference now to FIG. 2, a distributed coupon generating system 200 is shown in accordance with an embodiment. In one embodiment, distributed coupon generating system 200 includes a centrally managed campaign management subsystem 205 that may be an Internet accessible service, one or more coupon generating subsystem(s) 241 (e.g., 241a-241d), and at least one mobile device 202 with specialized application software designed to interact with coupon generating subsystem 241 and the campaign management subsystem 205. In one embodiment, mobile device 202 is a device such as, but not limited to, a mobile phone, a tablet computer, a laptop computer, a notebook computer, a personal digital assistant, and the like.

In one embodiment, coupon generating subsystem 241 includes a secure coupon-generating engine where coupon generation takes place. In addition to the coupon-generating engine 100, a coupon generating subsystem 241 could include one or more communication interfaces to support communication between the coupon generating subsystem 241 and campaign management subsystem 205 and between the coupon generating subsystem 241 and mobile device 202.

In one embodiment, campaign management subsystem 205 is an Internet accessible system that includes a human readable management interface such as a web browser used to set up and control coupon campaigns, and set up and control the coupon generating subsystem 241. Campaign management subsystem 205 also includes standard Internet data communications 210 interfaces to support communications with coupon generating subsystem 241 and with mobile devices 202. In one embodiment, campaign management subsystem 205 also includes a dedicated security component such as a Hardware Security Module 211 that is responsible for cryptographic key storage and operations in support of secure communication between the campaign management subsystem 205 and the coupon-generating engine 100.

Campaign management subsystem 205 may also contain one or more coupon-generating engine 100s that can be used to generate coupons for distribution directly to mobile devices.

As described herein, in one embodiment, the coupon-generating engine 100 is comprised of a tamper-resistant microprocessor capable of running multiple, secure, software applications. In one embodiment, software that governs the generation of a coupon is implemented in the microprocessor.

Coupon-generating engine 100 also includes support for cryptographic operations that are essential for maintaining the security and integrity of the software operations in the microprocessor and also support secure data communications with the campaign management subsystem 205. The security model for this invention relies on "end-to-end" security between the campaign management subsystem 205 and coupon-generating engine 100 where the authenticity and integrity of all communication can be verified by either "end" (campaign management subsystem 205 or coupon-generating engine 100). The data channel can also be encrypted end-to-end if required. This protection helps mitigate potential fraud involving the transmission of Campaign rules to a coupon-generating engine 100 that were not created by the campaign management subsystem 205. Implementation of end-to-end communication security and coupon generation with signatures or similar cryptographic elements is referred to herein as secure channel.

With reference still to FIG. 2, a number of embodiments for implementing a coupon generating subsystem 241a-241d are shown in accordance with an embodiment. An embodiment could be implemented using a variety of technologies in terms of the coupon-generating engine 100 and optional communication components. For example, mobile communications interface 227 enables the coupon-generating engine 100 to communicate directly with a mobile device. In contrast, communications interface 229 enables the coupon-generating engine 100 to communicate directly with the campaign management subsystem 205. In yet another embodiment, coupon-generating engine 100 may be integrated directly into a mobile device 204 as illustrated in coupon generating subsystem 241d. In the case of coupon generating subsystem 241d, the mobile device 204 is considered the dedicated communications capability supporting communications between the campaign management subsystem 205 and coupon-generating engine 100.

Coupon generating subsystem 241a is an embodiment of coupon-generating engine 100 being a standalone coupon generating subsystem 241a that includes coupon-generating engine 100 and an integrated ISO-14443 contactless communications interface and antenna that serves as the mobile communications interface 227. In one embodiment, coupon generating subsystem 241a communicates with a mobile device 202 that supports ISO-14443 communications. One such mobile device 202 device is an Android® smart phone with Near Field Communication (NFC). In general, NFC refers to is a set of standards for smartphones and similar devices to establish radio communication with each other by touching them together or bringing them into proximity. NFC applications include contactless transactions, data exchange, and simplified setup of more complex communications such as Wi-Fi. In another embodiment, tag communication refers to communication between an NFC device and an unpowered NFC chip.

NFC standards cover communications protocols and data exchange formats, and are based on radio-frequency identification (RFID) standards including ISO/IEC 14443 and FeliCa, ISO/IEC 18092 and the like which are defined by the NFC Forum.

With respect to coupon generating subsystem 241a, mobile device 202 transmits any campaign and management data on an intermittent basis from the campaign management subsystem 205 to the coupon-generating engine 100 using mobile communications interface 227 via mobile device 202. Similarly, mobile device 202 is also used to retrieve generated coupons from the coupon-generating engine 100 via this mobile communications interface 227 to mobile device 202 communications interface.

Coupon generating subsystem 241b is an embodiment of a coupon generating subsystem 241 with a number of components similar to those described in coupon generating subsystem 241a but also includes an additional dedicated campaign management subsystem communications interface 229 such as a Wi-Fi, Bluetooth, or mobile radio module. In one embodiment, the campaign management subsystem communications interface 229 is used to transmit campaign and management data from the campaign management subsystem 205 to the coupon-generating engine 100 and may be initiated by either the coupon-generating engine 100 or campaign management subsystem 205.

In one embodiment, mobile device 202 is used to retrieve generated coupons from the coupon-generating engine 100 in the coupon generating subsystem 241b via the ISO-14443 mobile communications interface 227 to NFC communications interface.

With reference to coupon generating subsystem 241c an embodiment of a coupon generating subsystem 241 that includes a dedicated communications component 233 such as a Wi-Fi, Bluetooth, or Cellular Radio module that serves as both the communications interface 229 and mobile communications interface 227 interfaces is shown.

Coupon generating subsystem 241d, illustrates an embodiment of the integration of the coupon-generating engine 100 in a mobile device 204. For example, mobile device 204 supports the loading of software in the tamper resistant Subscriber Identifier Module (SIM) in which case the coupon-generating engine 100 would be implemented within the SIM. Another embodiment hosts the coupon-generating engine 100 software in an embedded component of the mobile device 204. In yet another embodiment, coupon-generating engine 100 is implemented in a secure processing environment that can be plugged into an accessory slot of the mobile device 202 such as a microSD slot.

In one embodiment, since coupon generating subsystem 241d is an integrated component of a mobile device 204, communication of campaign and management data between the coupon-generating engine 100 and campaign management subsystem 205 would typically be accomplished via the cellular or Wi-Fi radio of the mobile device 204. In one embodiment, requesting and receiving coupons from the coupon-generating engine 100 is accomplished via an application programming interface (API) invoked by a mobile software application running in the mobile device 204.

Packaging and Integration of a Coupon Generating Subsystem

In one embodiment, coupon generating subsystem 241 is built as a standalone system in many form factors such as paper-type advertisements for a magazine, newspaper, poster, etc. In another example, coupon generating subsystem 241 is contained within items such as a key fob, plastic card, etc. A coupon generating subsystem 241 as described above in coupon generating subsystem 241a would be an example of the type of coupon generating subsystem 241 supporting this implementation.

In another embodiment, coupon generating subsystem 241 is electronically integrated within larger systems such as a digital billboard system, home entertainment system, home appliance, automobile, etc. For these latter examples, coupon generating subsystem 241 may be implemented in a fashion similar to coupon generating subsystem 241d where the coupon-generating engine 100 is integrated within a larger system that is responsible for data communications and can support the data communication needs of the coupon generating subsystem 241 to the campaign management subsystem 205. Alternatively, coupon generating subsystem 241 may include its own dedicated communications interface 229 capability, but will still be integrated electronically within the larger system to support other type of interactions with the larger system.

Mobile Device 202

In general, mobile device 202, and similarly mobile device 204, is a typical smart phone running an operating system. In one embodiment the operating system is the Android® operating system. However, the technology is well suited to other smart phone operating systems such as, but not limited to, iOS®, Windows Phone®, RIM Blackberry® OS etc. It should also be noted that the technology is platform and device independent.

In general, data communication between the mobile device 202 and campaign management subsystem 205 is typically accomplished via the integrated cellular or Wi-Fi radios of the mobile device 202. In one embodiment, communication between a mobile device 202 and coupon generating subsystem 241a and coupon generating subsystem 241b assumes an NFC capability in the mobile device 202. In another embodiment, communication between a mobile device 202 and coupon generating subsystem 241c assumes Wi-Fi, Bluetooth or cellular radio capability in the mobile device 202. And as described above, communication between a mobile device 202 and coupon generating subsystem 241d would take place via an API and application software running within the mobile device 202.

As stated previously, the technology is platform and device independent. This platform and device independence also extends to the definition of the communication interfaces. For example, although NFC, Wi-Fi, Bluetooth, and Cellular radio communication are cited as communication interface examples, other communications interfaces capable of transmitting the desired data between the subsystems may be utilized. For example, in place of NFC, sound waves, light waves and the like may be used to carry coupon-retrieval communication between the mobile device 202 and coupon generating subsystem 241 if both were appropriately implemented and configured. One of a plurality of possible sound wave communications examples is Zoosh® by Naratte®, which can provide secure, short-range, point-to-point communication over ultrasonic sound waves.

Campaign Setup

Figure 3A:
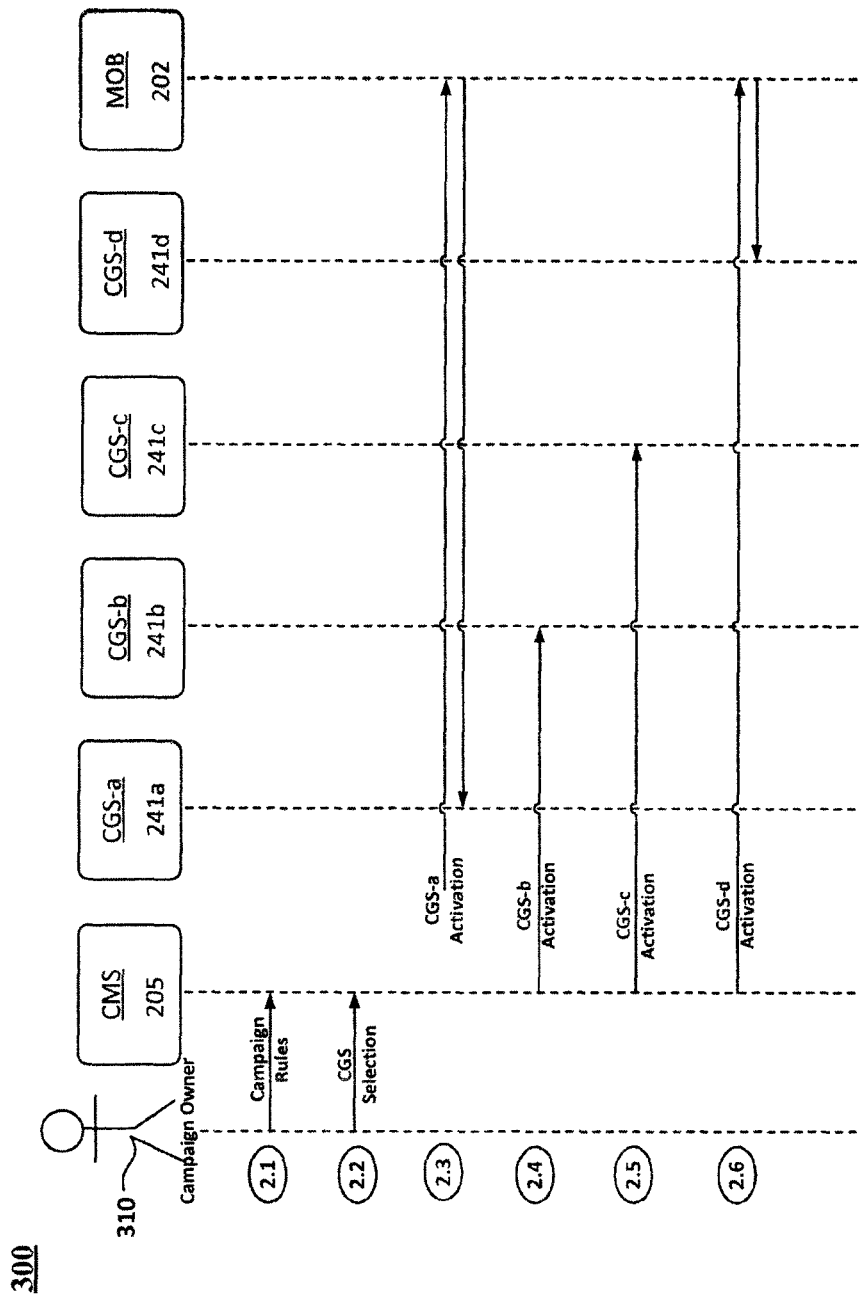
FIG. 3a is a chart depicting the set-up of a marketing campaign in accordance with an embodiment.

Referring now to FIG. 3a, a sequence diagram 300 depicting the set up a marketing campaign is shown in accordance with an embodiment. In one embodiment, campaign owner is a business owner who desires to run a campaign involving one or more of the coupon generating subsystem 241a-241d. Additionally, the mobile device 202 of FIG. 2 is assumed to be under the control of the campaign owner 310. The mobile device 202 in this sequence is used to activate coupon generating subsystems that do not include a dedicated network communication capability.

Figure 3B:
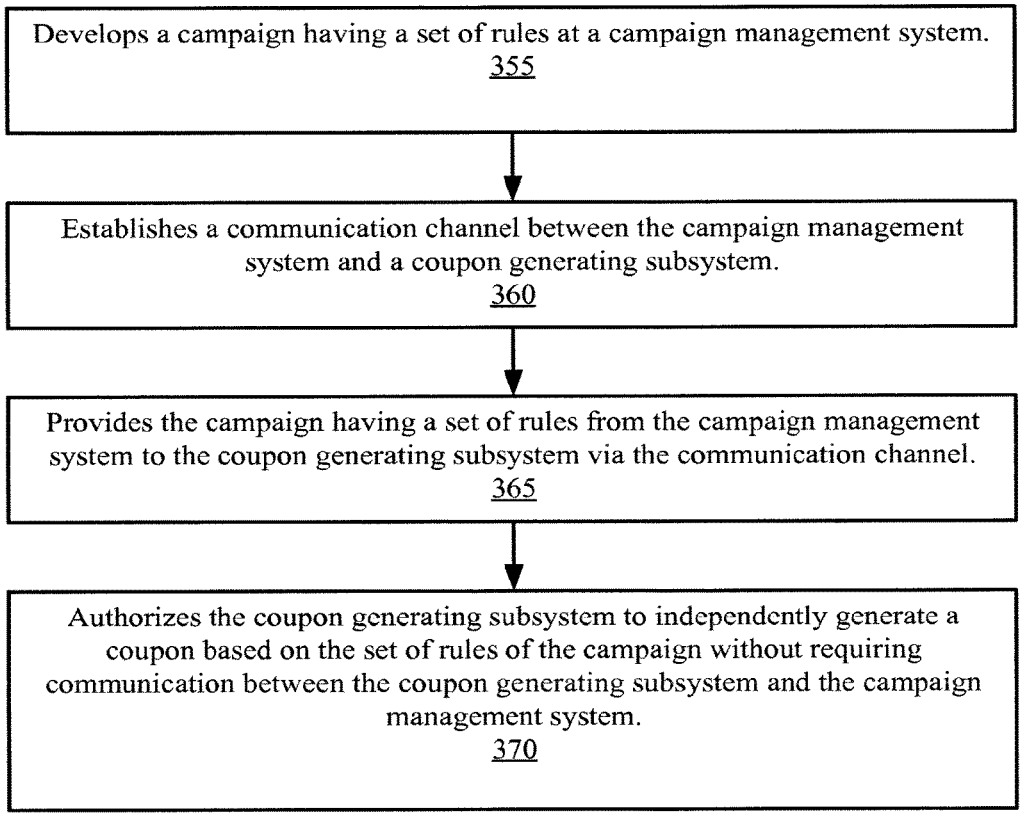
FIG. 3b is a flowchart of the setup of a marketing campaign in accordance with an embodiment.

Referring also to FIG. 3b, a flowchart 350 of the setup of a marketing campaign is shown in accordance with an embodiment. At 355 of FIG. 3b, one embodiment develops a campaign having a set of rules at a campaign management system. At 360 of FIG. 3b, one embodiment establishes a communication channel between the campaign management system and a coupon generating subsystem.

For example, with reference again to FIG. 3a, at 2.1 the campaign owner 310 interacts with the campaign definer module 215 of the campaign management subsystem 205 to set the types of a coupon that will be offered, and the rules involving the distribution of those coupons. For example, the campaign owner 310 may want to offer a very small number of high value coupons per coupon generating subsystem 241 or across the entire set of coupon generating subsystem 241 used in the campaign. Moreover, in a random reward embodiment, the campaign owner will determine odds that will affect the randomized behavior of the coupon generation.

In Step 2.2, the campaign owner 310 determines which coupon generating subsystem 241 will participate in the Campaign. In this case, it is assumed that there is at least one instance of each of the coupon generating subsystem 241a-241d types that will be used for the Campaign. The campaign owner 310 sets this selection using the coupon generating subsystem selection module 220 of the campaign management subsystem 205. Steps 2.3 to 2.6 involve the campaign activation module 225 according to the campaign owner's preferences as established in Steps 2.1 and 2.2.

For example, creating campaigns includes, in part, the creation of campaign rules related to the set up of the types of a coupon and number of a coupon to be distributed, and rules that may involve randomness in the coupon generation. Campaign creation also involves the identification of which coupon generating subsystem 241 will be used in the campaign. The campaign data is then transmitted to the coupon-generating engine 100 of the specified coupon generating subsystem 241 where the campaign data and associated rules are used to generate coupons within the coupon-generating engine 100. Once the rules and rewards are distributed to a coupon generating device, the coupon generating devices can then operate autonomously and even off-line. That is, they are secure, following the rules that were set and then generate tokens for the lifespan of the campaign.

Generation of the coupons will also typically involve a security operation such as a digital signature or generation of cryptogram to be used to verify the authenticity of the coupon. This cryptographic element can then be used subsequently to verify that a coupon was generated by an authentic coupon generating subsystem 241 and optionally can be linked to a specific instance of a mobile device or consumer using the mobile device. Authenticity is especially important in verifying high value coupons to ensure that the system only generates the correct number of high value coupons as specified by the campaign owner 310.

Referring again to FIG. 3b, at 365 of FIG. 3b, one embodiment provides the campaign having a set of rules from the campaign management system to the coupon generating subsystem via the communication channel. At 370 of FIG. 3b, one embodiment authorizes the coupon generating subsystem to independently generate a coupon based on the set of rules of the campaign without requiring communication between the coupon generating subsystem and the campaign management system For example, as shown in FIG. 3a, at Step 2.3, a coupon generating subsystem 241a is activated. In general, activation occurs with data communication via a mobile device 202. For example, campaign owner 310 uses a mobile device 202 with software for transmitting data between the campaign management subsystem 205 and the coupon generating subsystem 241a. In one embodiment, data communication between the campaign management subsystem 205 and mobile device 202 is via the Internet and cellular or Wi-Fi communications capability of the mobile device 202, and data communication between the mobile device 202 and coupon generating subsystem 241a is via ISO 14443 capability of the coupon generating subsystem 241a and NFC capability of the mobile device 202.

In Step 2.4, coupon generating subsystem 241b is activated. In general, activation occurs with data communication from the campaign management subsystem 205 to the coupon generating subsystem 241b via the Internet and the communications interface 229 capability of the coupon generating subsystem 241b.

In Step 2.5, coupon generating subsystem 241c is activated. In general, activation occurs with data communication from the campaign management subsystem 205 to the coupon generating subsystem 241c via the Internet and the dedicated communications component 233 capability of the coupon generating subsystem 241c.

Step 2.6 involves activating the coupon generating subsystem 241d with the campaign management subsystem 205 communicating with the coupon generating subsystem 241d via the Internet and cellular data communications capability of the mobile device 202.

It should be appreciated that the setup process may be run at any point during the lifecycle of a campaign. For example, the campaign owner 310 may choose to modify any or all of the rules of the campaign which had been previously set within one or more of the coupon generating subsystem 241a-d. This modification would result in the transmission of the new setup data to any of the affected coupon generating subsystem 241.

Coupon Request and Retrieval

Figure 4A:
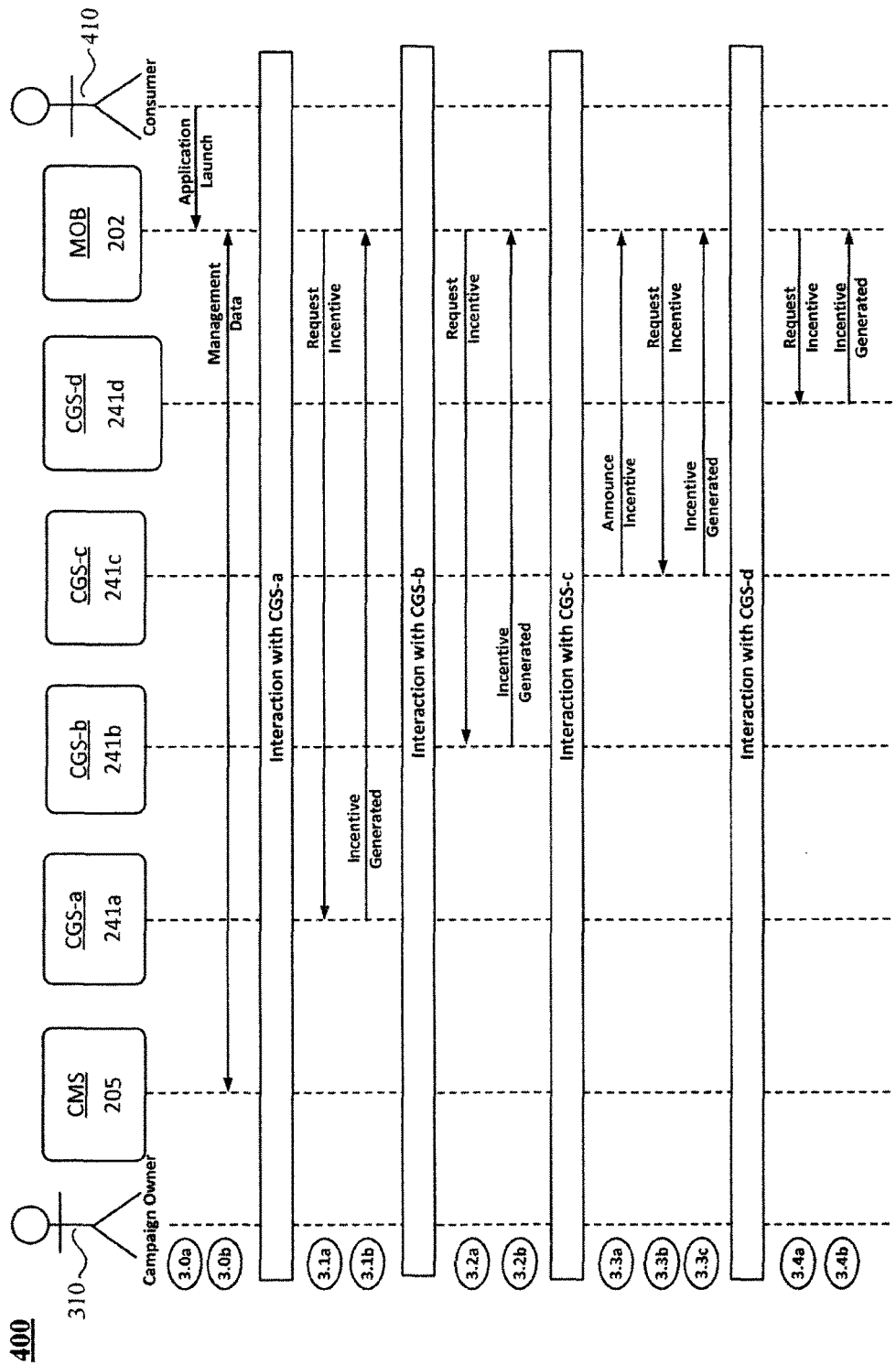
FIG. 4a is a sequence diagram depicting consumer interactions to retrieve coupons from the coupon generating subsystem in accordance with an embodiment.

With reference now to FIG. 4a, a sequence diagram 400 depicting the retrieval of a coupon via consumer interactions with the various forms of coupon generating subsystem 241. In one embodiment, the operation of sequence diagram 400 relies on a campaign that has previously been set up as illustrated in FIG. 3a. In FIG. 3a, mobile device 202 is a device belonging to a consumer 410 who uses it to retrieve coupons from one or more of the various coupon generating subsystems 241a-241d.

Referring also to FIG. 4b, a flowchart 450 for retrieving coupons from the coupon generating subsystem is shown in accordance with an embodiment. At 455 of FIG. 4b, one embodiment determines a mobile device is within a broadcast range of the coupon generating subsystem. At 460 of FIG. 4b, one embodiment queries the mobile device for identifying information. At 465 of FIG. 4b, one embodiment transmits a coupon from the coupon generating subsystem to the mobile device.

For example, suppose campaign owner 310 wants to run a campaign, such as a coupon special or the like. In one embodiment, coupon generating subsystem 241 is located at the door, on the way into the store. When a customer, passes the coupon generating subsystem 241, the customer uses her mobile device to interact with the coupon generating subsystem 241. For example, the interaction may be a near field communication (NFC), a tap between the user's mobile device 202 and coupon generating subsystem 241, or the like. The interacting allows coupon generating subsystem 241 to tell the mobile device 202 to launch an application while also delivering an instant reward. In one embodiment, the instant reward is delivered to the mobile device in less than a second.

In Step 3.0a consumer 410 uses a mobile device to interact with coupon generating subsystem 241. In one embodiment, the user launches a mobile application that contains software capable of interacting with coupon generating subsystem 241. However, in another embodiment, the interaction with coupon generating subsystem 241 launches an application on the user's mobile device in addition to providing an instant coupon.

At Step 3.0b, one embodiment synchronizes any management data between the campaign management subsystem 205 and the mobile device 202 software, such as, but not limited to, reporting and management of a campaign, the coupon generating subsystem 241 and instances of mobile device 202 software that may be available. In one embodiment, step 3.0b is optional or dependent on the availability of a connection between the mobile device 202 and campaign management subsystem 205 at the time synchronization is desired.

In Step 3.1a and 3.1b, software on the mobile device 202 communicates with coupon generating subsystem 241a via the NFC interface of the mobile device 202 and via the 14443 mobile communications interface 227 of the coupon generating subsystem 241a to retrieve a coupon.

In Step 3.2a and 3.2b, software on the mobile device 202 communicates with coupon generating subsystem 241b via the NFC interface of the mobile device 202 and via the 14443 mobile communications interface 227 of the coupon generating subsystem 241b to retrieve a coupon.

In Step 3.3a, the coupon generating subsystem 241c is broadcasting its coupon-generating service, which the mobile device 202 software can detect, assuming the mobile device 202 has the necessary hardware (e.g. Bluetooth if coupon generating subsystem 241c is broadcasting over Bluetooth). In Step 3.3b the software in the mobile device 202 responds to the broadcast from Step 3.3a and sends a coupon request to the coupon generating subsystem 241c via the communication interface defined in the broadcast. In Step 3.3c the coupon generating subsystem 241c responds to the mobile device 202 by sending a coupon back via the communication interface set up in Step 3.3b.

In Steps 3.4a and 3.4b software on the mobile device 202 invokes an API that requests and retrieves a coupon from the coupon generating subsystem 241d.

Coupon Generation

As described previously, each coupon-generating engine 100 is capable of generating coupons. The generation of the coupons is determined by the rules set by the campaign owner 310 via the campaign management subsystem 205. The rules can be as simple as only setting the number and types of a coupon to be generated. Thus, one embodiment utilizes coupon generating engine to generate the coupon based on the set of rules of the campaign and then utilizes a communications protocol to provide the coupon from the coupon generating engine to a mobile device.

In one embodiment, if randomness is also chosen as a factor for the coupon generation, additional rules will be included with desired odds of generation, a probabilistic algorithm and random number generator 103 in the coupon-generating engine 100 can then generate the randomized coupons according to those rules.

These rules can also include the ability to define coupon generation across multiple coupon-generating engines such that a pool of a coupon can be segmented and targeted to specific coupon-generating engines or spanning multiple coupon-generating engines. For example, a campaign owner 310 may wish to offer a limited number of high value coupons across multiple coupon-generating engines.

For example, campaign owner 310 may specify a total number of high value coupons to be offered which is less than the total number of targeted coupon-generating engines. In one embodiment, some coupon-generating engines will not be allowed to generate the high value coupons. In one embodiment, the campaign management subsystem 205 relies on the campaign owner 310 to indicate which coupon-generating engine 100 will generate the high value coupons and which will not.

In another embodiment where the campaign owner 310 wants to preserve randomness in the coupon generation process, the campaign management subsystem 205 could run a randomization routine to randomly select which coupon-generating engine 100 will be enabled to generate the highest value coupons. Any remaining coupon-generating engine 100 would receive rules that prevent them from generating the highest value coupons. In yet another embodiment, more sophisticated processes may be used, such as, where the rules are affected by additional data that is introduced into the coupon generation process throughout the lifecycle of a campaign.

In yet another embodiment, each distributed individual coupon generating subsystem 241 has its own random rule set. Thus, the results and rewards are specific to the particular coupon generating subsystem 241. For example, a random campaign may include rules such as: 1% of the people that interact with the coupon generating device will receive a 40% off coupon; 30% of the people that interact with the coupon generating device will receive a 20% off coupon; and 69% of the people that interact with the coupon generating device will receive a 10% off coupon. In other words, the campaign is similar to a sweepstakes.

In one embodiment, a random number generator is used at the coupon generating subsystem 241 to run the random campaign. Thus, as a user interacts with the coupon generating subsystem 241 the random number generator on the coupon generating subsystem 241 provides a number in the range of 1-100. If the number generated by the random number generator in is 1 then the person receives a 40% off coupon. If the number generated by the random number generator is 2-31 then the person receives a 30% off coupon, if the number generated by the random number generator in the coupon generating device is 32-100 then the user will receive a 10% off coupon.

One embodiment involves the linking of the time of day with the coupon generation process such that specific coupons are generated at the prescribed times. In another embodiment, where randomness is a factor in the coupon generation process, the odds of getting a higher value coupon may be greater or less at a particular time of day depending on the preference of the campaign owner. The time data could be known by the coupon-generating engine 100 as a result of using a clock internal to the coupon-generating engine 100 or coupon generating subsystem 241. In an alternative embodiment, the mobile device 202 provides an authenticated time data retrieved from the campaign management subsystem 205 and transmits it via mobile communications interface 227 to the coupon-generating engine 100.

In another embodiment, consumer 410 interaction with coupon generating subsystem 241 includes the transmission to the coupon-generating engine 100 of additional data such as profile data to indicate that consumer 410 is a member of a separate loyalty program with the campaign owner or even a first time user of the system. In one embodiment, the coupon-generating engine 100 uses this additional data element in the coupon generation process to generate a specific coupon or increase the odds of a higher value randomized coupon being generated at the time that consumer retrieves a coupon. Similarly, using additional data provided by the mobile device 202, a coupon generating subsystem 241 can determine if the same mobile device 202 was involved in previous interactions and either reward consumer 410 or prevent distribution of an additional coupon as set by campaign owner 310.

In yet another embodiment, the coupon generating subsystem 241 will keep count of the number of consumer visits and release a special reward based on the nth visitor. One variation involves the coupon generating subsystem 241 using the RNG 103 to determine the value used for the "nth" visitor.

Another example involves rewarding the consumer for visiting multiple coupon generating subsystems. For example, consumer 410 visits one coupon generating subsystem 241 and collecting a digital coupon. The digital coupon is stored in the mobile device 202. Consumer 410 then visits a second coupon generating subsystem 241 and when retrieving a coupon therefrom, the data from the first coupon is shared with the second coupon generating subsystem 241. The second coupon generating subsystem 241 uses the additional data to generate a specific new coupon or to increase the odds of a higher value coupon being generated.

Another example illustrates the retrieval of a coupon from an online web site managed by the campaign owner 310. The online coupon was generated by the coupon-generating engine 100 contained within the campaign management subsystem 205. The consumer uses his mobile device 202 to retrieve the online coupon and is then rewarded for visiting a subsequent physical coupon-generating engine 100 due to the fact that data related to the online coupon is transmitted to the physical coupon-generating engine 100 visited by consumer 410. The physical coupon-generating engine 100 can validate the data from the online coupon and alter its coupon generation result accordingly.

In one embodiment, the validation process is part of the overall redemption process and can involve control and counting of individual rewards and countdown of rewards that have been issued by the system, and the like. For example, a campaign may include two grand prizes such as, for example, two bicycles. When a consumer wins one of the grand prizes, the campaign management subsystem 205 is notified of the redemption, such as during the validation. At that time, campaign management subsystem 205 will update the campaign to note that only one bicycle remains. Similarly, when the second bicycle coupon is redeemed, the campaign management subsystem 205 will update the campaign to note that both grand prizes have been awarded. As such, any additional coupons for the grand prize would not be awarded and any attempts to redeem a grand prize coupon would be flagged.

In yet another embodiment, viral distribution from one consumer to another consumer could be set up in the rules to reward a consumer 410 for sharing a coupon with her friends and family. For example, consumer 1 retrieves a coupon from a coupon generating subsystem 241 and is encouraged to send that coupon to a friend or family member via some electronic transmission means such as email, text messaging, etc. Consumer 2, who receives the coupon from consumer 1, uses his mobile device 202 and software thereon to store the coupon. In addition, consumer 2 visits another coupon generating subsystem 241 that is running the campaign from the first coupon. When consumer 2 interacts with a coupon generating subsystem 241, data from the first coupon is transmitted to the coupon generating subsystem 241. In one embodiment, the data is used to reward consumer 2 with a specific coupon or adjust the odds of consumer 2 receiving a higher value coupon.

In addition, in the viral distribution scenario, consumer 1 will receive a reward for sharing his coupon. Although there are numerous ways that the rewards could be generated, in one embodiment the campaign management subsystem 205 is notified of the coupon transfer by the mobile device 202 and immediately generates a coupon and sends it to consumer 1. Once consumer 2 shares consumer 1's coupon with a coupon generating subsystem 241, an additional reward is delivered to consumer 1.

For example, campaign management subsystem 205 is notified of consumer 2's interaction with a coupon generating subsystem 241. The notification could occur via the mobile device 202, via the communications interface 229 of the coupon generating subsystem 241 or the like. Once notification is received, the campaign management subsystem 205 generates a coupon and sends it to consumer 1. That host-generated coupon could be of higher value or could be used by the first consumer to increase the odds of higher value coupon generation during a future interaction between consumer 1 and a coupon generating subsystem 241 in the campaign.

In one embodiment, the coupon generation process may be linked to an instant online purchase process whereby a coupon represents a voucher for a purchase of a specific product or service. For example, the coupon-generating engine 100 would generate the coupon with all pertinent purchase information from the campaign owner such as SKU number, price, delivery terms, etc. Consumer 410 would use their mobile device 202 to accept the terms of the coupon and combine that coupon with all necessary payment data such as stored credit card data in a mobile application or references to online stored credit card data, and transmit that coupon and associated data via the cellular or Wi-Fi radio of the mobile device 202 to campaign owner 310 online storefront to complete the purchase transaction. Such a process could be described as a "one tap purchase" or "one tap buy" for those implementations where consumer 410 is interacting with a coupon generating subsystem 241 via NFC.

Although a number of embodiments for introducing data into the coupon generation process to derive a wide variety of campaigns are discussed, the discussion is not exhaustive. It should also be noted that although this example embodiment involves the use of smart phones as the mobile device 202 that is used by the consumer to retrieve the generated coupon, in another embodiment the coupon generating subsystem 241 is integrated in a system that includes a paper printer and the result of the coupon generation is a paper coupon that is printed out for consumer 410. Examples of the latter system type that could include an integrated coupon-generating engine 100 include a kiosk or point-of-sale coupon-printing system and the like.

Coupon Generation Associated with Games-of-Chance

In another embodiment, traditional game-of-chance algorithms are used by the coupon-generating engine 100 to generate coupons. For example, the randomization process could be based on game-of-chance elements such as cards, dice, spinning wheels, random number drawing, etc. As such, one embodiment could include consumer 410 interacting with a coupon generating subsystem 241 where consumer 410 is not aware of the underlying algorithm used to generate a coupon but the algorithm happens to be a game-of-chance with standard distribution odds associated with the game.

Alternatively, consumer 410 could engage with the coupon generating subsystem 241 with software that exposes a gaming experience as a part of the coupon generation process. For example, a coupon generating subsystem 241a implements a slot machine engine and a mobile device 202 has software that simulates the user experience of a video slot machine when consumer 410 interacts with the coupon generating subsystem 241a. In one embodiment, the payout table that the slot machine is operating against is set up by the campaign owner 310 as part of the rules in the campaign management subsystem 205. The payouts are the coupons that are awarded by the coupon generating subsystem 241a accordingly. As with the previous descriptions where additional data can be introduced to the coupon generating subsystem 241 to affect the outcome of coupon generation process, the same would apply to coupon generation involving game-of-chance algorithms. For example, visiting multiple coupon generating subsystems could result in consumer 410 being offered higher odds with successive visits to each additional coupon generating subsystem 241.

In another embodiment, virtual currencies such as loyalty points could be introduced into the coupon generation process where consumer 410 is allowed to wager in the interaction with the coupon generating subsystem 241. For example, consumer 410 will accumulate a larger number of loyalty points that can then be exchanged for high value coupons. This exchange could occur via the coupon generating subsystem 241 or through the campaign management subsystem 205.

Pre-Generated Coupons

In another embodiment, coupon-generating engine 100 contained within the campaign management subsystem 205 is used to generate a large number of a coupon of differing values and securely load those coupons into coupon generating subsystem 241 for distribution. In so doing, the pre-generated coupons may be distributed by the coupon generating subsystem 241.

Coupon Verification

Figure 5A:
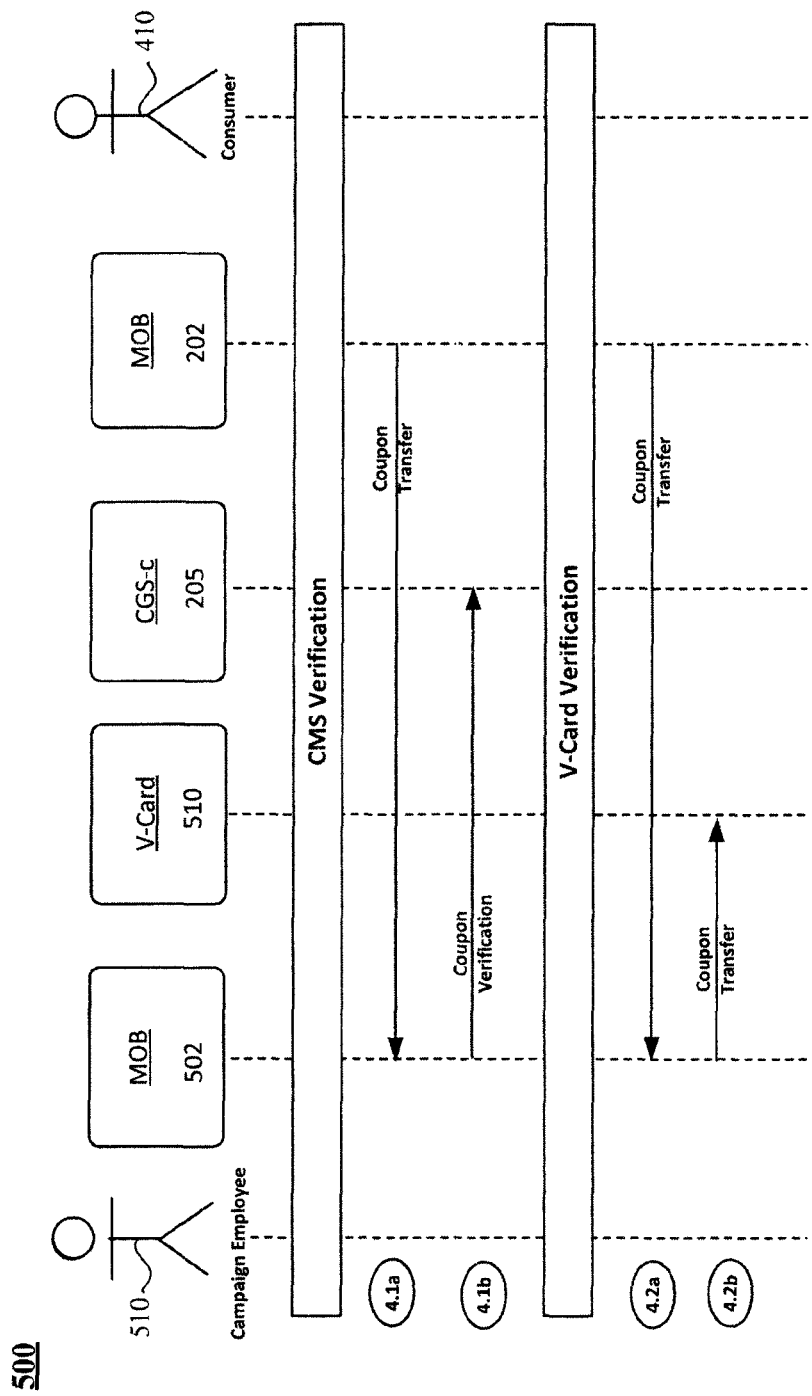
FIG. 5a is a chart depicting the verification of a generated coupon in the coupon management system in accordance with an embodiment.

FIG. 5a is a sequence diagram 500 used to verify the authenticity of a coupon. As stated herein, verifying the authenticity of generated coupons is an important aspect of the technology. In one embodiment, the coupon includes some cryptographic element such as a signature that was securely generated by the coupon-generating engine 100 during the coupon generation process by the coupon-generating engine 100.

Referring also to FIG. 5b, a flowchart 550 depicting the verification of a generated coupon is shown in accordance with an embodiment. At 555 of FIG. 5b, one embodiment receives a coupon transferred from a customer mobile device to a mobile device associated with the campaign. At 560 of FIG. 5b, one embodiment utilizes the mobile device associated with the campaign to perform a validation of the coupon. At 565 of FIG. 5b, one embodiment honors a valid coupon. At 570 of FIG. 5b, one embodiment denies an invalid coupon or a coupon that has been previously redeemed.

For example, with reference again to FIG. 5a, one embodiment of coupon verification involves the transfer of a coupon from a consumer to an employee 510 of the campaign owner 310 associated with a campaign (Campaign Employee) who is then able to transfer the coupon to the campaign management subsystem 205 for verification. The campaign management subsystem 205 is then used as the central verification system for coupons as specified by the campaign owner 310. Once a coupon is submitted to the campaign management subsystem 205 for verification and verification is confirmed, that particular coupon will be rejected if submitted again. This central verification system is used to verify high value coupons to prevent fraud.

For example, in Step 4.1a consumer 410 uses his mobile device 202 to transfer a previously acquired coupon, to the employee 510 mobile device 502 for verification.

In Step 4.1b employee 510 uses a mobile device 502 to transmit the coupon to the campaign management subsystem 205 which is then able to verify the authenticity of the coupon.

For lower value coupons, it's possible that a campaign owner 310 may rely on systems that have components similar to a coupon-generating engine 100 but are designed to verify coupons rather than generate them. One embodiment involves a coupon verification card 510 (vCard) that is a plastic card that has the same hardware components as a coupon generating subsystem 241a but includes software that is used to verify coupons. In this example, consumer 410 attempts to redeem a coupon with an employee 510 of the campaign by transferring the coupon from the consumer's mobile device 202 to a mobile device 502 under the control of the employee 510. Employee 510 uses software on his mobile device 502 to verify the coupon via NFC-to-14443 communication between the mobile device 502 and vCard 510.

For example, in Step 4.2a consumer 410 uses his mobile device 202 to transfer a previously acquired coupon, to the mobile device 502 of employee 510 for verification.

In Step 4.2b, employee 510 uses mobile device 502 to transfer the coupon to a vCard 510 which is then able to verify the authenticity of the coupon.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for electronically delivering coupons via a coupon generating subsystem to a plurality of mobile devices via gaming sessions experienced on the mobile devices, the coupon generating subsystem including (i) a coupon generating engine having a central processing unit, a random number generator, and a memory, and (ii) a mobile communications interface, each mobile device including (i) a contactless communications interface, (ii) a display, and (iii) application software that displays results of a game of chance, the method comprising:
   (a) storing in the memory of the coupon generating subsystem a set of rules associated with delivery of the coupons from the coupon generating subsystem to the mobile devices, wherein the set of rules include a payout table that determines the value of coupons that are delivered;
   (b) automatically initiating a gaming session on one of the mobile devices using the application software in the mobile device upon detection by the contactless communications interface that the mobile device is within a broadcast range of the coupon generating subsystem, wherein communications for the gaming session occurs using the contactless communications interface of the mobile device and the mobile communications interface of the coupon generating subsystem;
   (c) displaying the gaming session on the display of the mobile device, wherein the gaming session uses the random number generator and central processing unit to generate a result for the game of chance using the payout table in the memory, the result determining the value of a coupon to be electronically delivered via the coupon generating subsystem to the mobile device; and
   (d) electronically delivering the coupon from the coupon generating subsystem to the mobile device.

2. The method of claim 1 wherein the game of chance is a video slot machine experience.

3. The method of claim 1 wherein the contactless communications interface is a Near Field Communication (NFC) interface.

4. The method of claim 1 further comprising:
   (f) generating by the coupon generating engine a digital signature or cryptogram of each generated coupon and associating the digital signature or cryptogram with each generated coupon for subsequent use in verifying the authenticity of the coupon.

5. The method of claim 1 wherein the coupon generating engine is a computer on a chip embedded in packaging.

6. The method of claim 1 wherein the communications for the gaming session uses a communications protocol selected from the group consisting of: a Near Field Communication (NFC) protocol, a Wi-Fi communication protocol, a Bluetooth communication protocol, and a sound wave communication protocol.

7. The method of claim 1 wherein the mobile devices are selected from the group consisting of: a mobile phone, a tablet computer, a laptop computer, a notebook computer, and a personal digital assistant.

8. A distributed system for electronically delivering coupons comprising:
   (a) a coupon generating subsystem including:
      (i) a coupon generating engine having a central processing unit, a random number generator, and a memory, and
      (ii) a mobile communications interface;
   (b) a plurality of mobile devices, each mobile device including:
      (i) a contactless communications interface,
      (ii) a display, and
      (iii) application software that displays results of a game of chance,
   wherein the coupon generating subsystem is configured to electronically deliver the coupons to the plurality of mobile devices via gaming sessions experienced on the mobile devices, wherein the memory of the coupon generating subsystem stores a set of rules associated with delivery of the coupons from the coupon generating subsystem to the mobile devices, the set of rules including a payout table that determines the value of coupons that are delivered, wherein the application software in each of the mobile devices is configured to automatically initiate a gaming session on the mobile device upon detection by the contactless communications interface that the mobile device is within a broadcast range of the coupon generating subsystem, and wherein communications for the gaming session occurs using the contactless communications interface of the mobile device and the mobile communications interface of the coupon generating subsystem, wherein the application software in the mobile device is further configured to display the gaming session on the display of a mobile device, and wherein during the gaming session, the random number generator and the central processing unit generate a result for the game of chance using the payout table in the memory, the result determining the value of a coupon to be electronically delivered via the coupon generating subsystem to the mobile device.

9. The distributed system of claim 8 wherein the game of chance is a video slot machine experience.

10. The distributed system of claim 8 wherein the contactless communications interface is a Near Field Communication (NFC) interface.

11. The distributed system of claim 8 wherein the coupon generating engine is configured to generate a digital signature or cryptogram of each generated coupon and to associate the digital signature or cryptogram with each generated coupon for subsequent use in verifying the authenticity of the coupon.

12. The distributed system of claim 8 wherein the coupon generating engine is a computer on a chip embedded in packaging.

13. The distributed system of claim 8 wherein the communications for the gaming session uses a communications protocol selected from the group consisting of: a Near Field Communication (NFC) protocol, a Wi-Fi communication protocol, a Bluetooth communication protocol, and a sound wave communication protocol.

14. The distributed system of claim 8 wherein the mobile devices are selected from the group consisting of: a mobile phone, a tablet computer, a laptop computer, a notebook computer, and a personal digital assistant.

15. A method for electronically delivering coupons via a plurality of coupon generating subsystems to a plurality of mobile devices via gaming sessions experienced on the mobile devices, each coupon generating subsystem including (i) a coupon generating engine having a central processing unit, a random number generator, and a memory, and (ii) a communications interface, each mobile device including (i) a mobile device communications interface, (ii) a display, and (iii) application software that displays results of a game of chance, and wherein each of the coupon generating subsystems is an integrated component of a respective mobile device, the method comprising:

(a) storing in the memory of the coupon generating subsystem a set of rules associated with delivery of the coupons from the coupon generating subsystem to the mobile devices, wherein the set of rules include a payout table that determines the value of coupons that are delivered;

(b) initiating a gaming session on one of the mobile devices using the application software in the mobile device, wherein communications for the gaming session occurs using the communications interface of the mobile device and the communications interface of the coupon generating subsystem;

(c) displaying the gaming session on the display of the mobile device, wherein the gaming session uses the random number generator and central processing unit to generate a result for the game of chance using the payout table in the memory, the result determining the value of a coupon to be electronically delivered via the coupon generating subsystem to the mobile device; and (d) electronically delivering the coupon from the coupon generating subsystem to the mobile device.

16. The method of claim 15 wherein the integrated component is selected from the group consisting of: a Subscriber Identifier Module (SIM) installed within the mobile device, an embedded component of the mobile device, and a plug-in component that installs in an accessory slot of the mobile device.

17. The method of claim 15 wherein the game of chance is a video slot machine experience.

18. The method of claim 15 wherein the coupon generating engine is configured to generate a digital signature or cryptogram of each generated coupon and to associate the digital signature or cryptogram with each generated coupon for subsequent use in verifying the authenticity of the coupon.

19. The method of claim 15 wherein the coupon generating engine is a computer on a chip embedded in packaging.

20. The method of claim 15 wherein the mobile devices are selected from the group consisting of: a mobile phone, a tablet computer, a laptop computer, a notebook computer, and a personal digital assistant.

21. A distributed system for electronically delivering coupons comprising:

(a) a plurality of coupon generating subsystems, each coupon generating subsystem including:
 (i) a coupon generating engine having a central processing unit, a random number generator, and a memory, and
 (ii) a communications interface;

(b) a plurality of mobile devices, each mobile device including:
 (i) a mobile device communications interface,
 (ii) a display, and
 (iii) application software that displays results of a game of chance, wherein each of the coupon generating subsystems is an integrated component of a respective mobile device, wherein the coupon generating subsystem is configured to electronically deliver the coupons to the plurality of mobile devices via gaming sessions experienced on the mobile devices, wherein the memory of the coupon generating subsystem stores a set of rules associated with delivery of the coupons from the coupon generating subsystem to the mobile devices, the set of rules including a payout table that determines the value of coupons that are delivered, wherein the application software in each of the mobile devices is configured to initiate a gaming session on the mobile device, and wherein communications for the gaming session occurs using the communications interface of the mobile device and the communications interface of the coupon generating subsystem, wherein the application software in the mobile device is further configured to display the gaming session on the display of a mobile device, and wherein during the gaming session, the random number generator and the central processing unit generate a result for the game of chance using the payout table in the memory, the result determining the value of a coupon to be electronically delivered via the coupon generating subsystem to the mobile device.

22. The distributed system of claim 21 wherein the integrated component is selected from the group consisting of: a Subscriber Identifier Module (SIM) installed within the mobile device, an embedded component of the mobile device, and a plug-in component that installs in an accessory slot of the mobile device.

23. The distributed system of claim 21 wherein the game of chance is a video slot machine experience.

24. The distributed system of claim 21 wherein the coupon generating engine is configured to generate a digital signature or cryptogram of each generated coupon and to associate the digital signature or cryptogram with each generated coupon for subsequent use in verifying the authenticity of the coupon.

25. The distributed system of claim 21 wherein the coupon generating engine is a computer on a chip embedded in packaging.

26. The distributed system of claim 21 wherein the mobile devices are selected from the group consisting of: a mobile phone, a tablet computer, a laptop computer, a notebook computer, and a personal digital assistant.

* * * * *